(12) United States Patent
Viggiano et al.

(10) Patent No.: US 7,804,981 B2
(45) Date of Patent: Sep. 28, 2010

(54) METHOD AND SYSTEM FOR TRACKING POSITION OF AN OBJECT USING IMAGING AND NON-IMAGING SURVEILLANCE DEVICES

(75) Inventors: Marc J Viggiano, Manlius, NY (US); Todd A Donovan, Dewitt, NY (US); Michael J Gerry, Manlius, NY (US); Lara Marisa Parks, Dewitt, NY (US)

(73) Assignee: Sensis Corporation, East Syracuse, NY (US)

( * ) Notice: Subject to any disclaimer, the term of this patent is extended or adjusted under 35 U.S.C. 154(b) by 1531 days.

(21) Appl. No.: 11/040,498

(22) Filed: Jan. 21, 2005

(65) Prior Publication Data
US 2010/0002077 A1    Jan. 7, 2010

Related U.S. Application Data

(60) Provisional application No. 60/643,719, filed on Jan. 13, 2005.

(51) Int. Cl.
*G06K 9/00* (2006.01)
(52) U.S. Cl. .................. 382/104; 382/103; 342/357.08
(58) Field of Classification Search ................ 382/103, 382/104; 342/357.08
See application file for complete search history.

(56) References Cited

U.S. PATENT DOCUMENTS

| | | | |
|---|---|---|---|
| 4,655,540 A | | 4/1987 | Wood et al. |
| 4,866,273 A | * | 9/1989 | Kobayashi et al. .......... 250/311 |
| 5,838,365 A | * | 11/1998 | Sawasaki et al. ............ 348/169 |
| 5,848,420 A | * | 12/1998 | Xu ........................... 707/104.1 |
| 5,852,792 A | * | 12/1998 | Nielson ....................... 701/222 |
| 5,917,449 A | * | 6/1999 | Sanderford et al. .......... 342/457 |
| 6,078,681 A | * | 6/2000 | Silver .......................... 382/133 |
| 6,124,825 A | * | 9/2000 | Eschenbach ........... 342/357.08 |
| 6,356,758 B1 | * | 3/2002 | Almeida et al. ............. 455/446 |
| 6,437,797 B1 | * | 8/2002 | Ota ............................ 345/638 |
| 2001/0040636 A1 | * | 11/2001 | Kato et al. ............. 348/333.03 |
| 2002/0109625 A1 | * | 8/2002 | Gouvary ....................... 342/29 |
| 2004/0151345 A1 | * | 8/2004 | Morcom ..................... 382/104 |
| 2006/0187421 A1 | * | 8/2006 | Hattori et al. ................. 353/69 |

FOREIGN PATENT DOCUMENTS

| | | |
|---|---|---|
| EP | 0 967 584 | 12/1999 |
| WO | 92/06442 | 4/1992 |
| WO | 02/101411 | 12/2002 |

* cited by examiner

*Primary Examiner*—John B Strege
(74) *Attorney, Agent, or Firm*—Burr & Brown

(57) ABSTRACT

A method and system for tracking the position of objects, such as aircraft and ground vehicles around an airport. A transmission from the object is received at a non-imaging surveillance device of known location, the transmission being used to determine the coordinate position of the object within a given time period. Image data for the object is captured by an imaging surveillance device of known location to provide an image of the object within the same given time period. The coordinate position is correlated with the image to provide composite data about the object within the same given time period. The composite data is displayed to a viewer as a visual depiction of the object.

50 Claims, 7 Drawing Sheets

METHOD AND SYSTEM FOR TRACKING POSITION OF AN OBJECT USING IMAGING AND NON-IMAGING SURVEILLANCE DEVICES

CROSS REFERENCE TO RELATED APPLICATION

This application claims the benefit of U.S. Provisional Application Ser. No. 60/643,719 filed Jan. 13, 2005, the entirety of which is incorporated herein by reference.

FIELD OF THE INVENTION

The present invention relates to a method and system for tracking the position of an object using imaging and non-imaging surveillance devices. In particular, the present invention relates to a method and system for tracking aircraft and ground vehicles in and around an airport using data supplied by air traffic surveillance devices, such as ADS-B transceivers, and fusing that data with real-time image data of the aircraft and ground vehicles.

BACKGROUND OF THE INVENTION

The management of airport terminal operations has always been a daunting task due not only to the aircraft traffic in and around the airport, but also the movement of the associated ground vehicles necessary to service the aircraft. As international commerce has grown over the years, so has the amount of traffic passing through virtually every airport around the world. Industry experts are currently predicting a three-fold increase in demand for flight operations over the next twenty years. As additional flights and aircrafts are added to handle this growth, the number and size of airports, too, must grow to accommodate the increased traffic.

As it stands now, however, airports today are, in many cases, the limiting factor in aviation system capacity. Since each airport is different, each airport has a unique set of capacity limiting factors. These limiting factors include tarmac space, number of runways, number of suitable approaches, and the extent of navigational and Air Traffic Control (ATC) facilities. The continued growth of air traffic will generate additional demand for operations on the airport surface. Many airports are at or near the capacity limit for their current configuration and thus become bottlenecks for overall aviation system performance and generate significant delay.

Modern-day airport ATC procedures and general airport aviation operations procedures are based, in large part, on procedures originating from the 1950's. The ATC procedures were initially developed to ensure adequate separation between airborne aircraft, when the only surveillance system available was a radar system using a rotating radar antenna. This type of surveillance can be considered "non-cooperative" surveillance because it does not rely upon any transmissions from the aircraft to detect the presence and position of the aircraft. Specifically, the traditional radar systems calculated the position of a target using a range value based on signal transit time and the azimuth angle of the antenna. The position of the target was then usually provided on a 2-dimensional display with other detected targets, objects and clutter.

The accuracy of radar generated position data was later enhanced by early "cooperative" surveillance systems, which used transponders on the aircraft to provide aircraft identification and altitude information to ground-based receivers. These types of surveillance systems can be considered "cooperative" because the aircraft, in emitting transmission signals, is cooperating with the surveillance system. One example of such an early "cooperative" surveillance system is the Identification Friend or Foe (IFF) system, also known as the Secondary Surveillance Radar (SSR) system and Air Traffic Control Radar Beacon System (ATCRBS) system. The aircraft-supplied altitude information supplied by the IFF system removed some of the inaccuracies inherent in radar systems by providing one of the coordinate values for the target aircraft. The transponder was the key element in early cooperative surveillance systems, since without it no identification (other than visual) and no altitude information were provided to the ATC system.

These surveillance systems served the aviation system well for decades by preventing countless mishaps over the years, and are still in use today. In the 1990s, however, the FAA encouraged the development and implementation of new multi-function technologies offering superior performance compared to the radar-based systems. The first improvement came in the form of multilateration (MLAT) systems, which employed ground-based receivers around an airport to process periodic transmissions from equipped aircraft near the airport, and determined the location of the aircraft on a differential time of arrival (DTOA) basis. MLAT systems are still in use today.

Then came broadcast surveillance systems, such as automatic dependent surveillance-broadcast (ADS-B). ADS-B uses GPS technology to determine current aircraft position data on-board the aircraft itself, and then the aircraft periodically broadcasts its position and identification data. The ADS-B transmissions can be received and decoded by ground-based receivers and other ADS-B equipped aircraft to provide accurate position data to ATC operators and surrounding ADS-B equipped aircraft.

In addition to the surveillance systems described above, air traffic controllers also make use of primary surveillance radar (PSR), airport surface detection radar (ASDE) and parallel runway monitoring (PRM) radar. In order to provide all these sources of data to the air traffic controller in a manageable fashion, companies like Sensis Corporation have developed methods and systems for fusing the various data together, so that the air traffic controller sees a single output (e.g., a symbol on a 2-D display) representing a single aircraft, even though a variety of sensor data was used to determine the identity and location of that particular aircraft.

While all of these improvements have greatly increased aviation safety in and around airports, the continued growth of air traffic will present new challenges to the industry. For example, during the next two decades, global air travel demand is expected to grow by an estimated 5.2% annually and result in nearly a three-fold increase in the number of flights compared to current traffic levels. Three primary approaches will be used to accommodate this growth in demand: (a) operate more flights in non-prime hours such as nighttime; (b) expand the number of runways at busy airports; and/or (c) shift operations to other local airports that have spare capacity.

Option (a) suffers from the problem of increased noise pollution in populated areas and the associated complaints from residents. Therefore, option (a) will provide some capacity benefits but will result in more flights occurring during low visibility periods. Due to the limited amount of real estate available around existing airports, especially in metropolitan areas, it will be difficult for existing airports to exercise option (b). As airports exercise option (b) the greater sprawl of the airport's runways and taxiways will reduce the air traffic controller's ability to visually track operations for the air traffic control tower. Several airports are building taller multimillion dollar ATC towers for improved airport situational awareness to address this challenge, but as the airport becomes larger and more complex it becomes increasingly difficult to find a single location at which an air traffic control tower can provide the required visibility. Ultimately, many of these airports will have no choice but to off-load traffic to the growing number of small reliever and community airports. Small airports in turn, will seek solutions to enable growth, but will be hindered by the expenditures required for air traffic services. One of the most significant expenditures for such small airports will be the cost of a suitable ATC tower.

The current ATC procedures require the ATC operators to provide air traffic services by labor intensive hands-on control of each aircraft. While the systems described above have allowed ATC operators to be more efficient and have greatly increased safety, an integral piece of data still used by ATC operators managing airport operations is the visual data collected through their own eyes. The ability of the ATC operators to look out the window of the ATC tower and confirm, visually, what they see as a symbol generated by the surveillance systems (cooperative and non-cooperative) explains why ATC towers have a 360 degree view of the airport and its surroundings, and also explains why ATC towers are the only building of any significant height in and around the airport.

There are several problems, however, with such traditional ATC towers. The most obvious problem is the height of the tower itself. Aircraft necessarily have to maintain a significant distance from the ATC tower to avoid collision and to prevent line-of-sight interference between the ATC operators and other aircraft. Secondly, since all of the ATC operators reside within the tower, those operators have only a single perspective viewpoint of the entire airport and its surroundings. This approach is overkill for some operators who are responsible for only a certain segment of the airport (e.g., arrival and departure). A better position for those operators would be near the ends of the operative runways, but a second ATC tower at such a location would create an unacceptable obstruction for arriving and departing aircraft.

Perhaps the most significant problem with traditional ATC towers has been mentioned above—they are incredibly expensive to erect and maintain. This cost factor could prove to be the inhibiting factor for smaller "reliever" airports being able to accept an increased amount of air traffic, commensurate with what a "towered" airport could handle.

The current air traffic control model fails to leverage new and emerging technologies to increase safety while reducing costs. Thus, continued support for the current air traffic control model comprised of on-airport infrastructure and resources, including surveillance automation systems, air traffic controllers, and maintenance technicians, will require a significant and continuous investment in the air traffic infrastructure simply to meet the increasing demand while trying to maintain current safety levels. This runs counter to the aviation industry's goal of improving safety while reducing operational costs, year after year.

The operational requirements of the airport and terminal control area involve all facets of aviation, communication, navigation and surveillance. The satisfaction of these operational requirements with technological/procedural solutions needs to be based upon three underlying principles; improved safety, improved capacity and cost effectiveness. For the reasons cited above, the traditional approach of tall airport towers at every airport of moderate activity, or the requirement that every airport of moderate activity have some type of air traffic control on-site, is quickly becoming impractical.

For the reasons explained above, there is a dire need for a new ATC paradigm that does not require on-site physical ATC towers and resident operators, not to mention the maintenance infrastructure necessary to support those towers and operators.

SUMMARY OF THE INVENTION

In accordance with one embodiment of the present invention, there is provided a method for tracking the position of an object, including the steps of (a) receiving, at a non-imaging surveillance device of known location, a transmission from the object, the transmission being used to determine the coordinate position of the object within a given time period, (b) capturing image data for the object at an imaging surveillance device of known location to provide an image of the object within the same given time period, (c) correlating the coordinate position with the image to provide composite data about the object within the same given time period, and (d) displaying the composite data to a viewer as a visual depiction of the object.

The transmission may contain position data for the object, or the transmission can be generated in response to a directional interrogation from one of the non-imaging surveillance devices, and then processed to calculate the range and azimuth of the object relative to the interrogating device.

Alternatively, the transmission may be received at a plurality of non-imaging surveillance devices of known location, and then processed to derive position data for the object by a multilateration algorithm, for example. It is also possible that the transmission is generated in response to an interrogation from a non-imaging surveillance device, and then processed to determine range from the interrogating device and azimuth from the other devices using the difference in time of arrival of the transmission at each device.

It is also possible to generate position data for the object within the same given time period using a non-interrogating, non-imaging surveillance device (e.g., primary radar), and then correlate the coordinate position derived through step (a) with the position data that was generated using the non-interrogating, non-imaging surveillance device.

Preferably, the imaging surveillance device includes a camera operating in at least one of the visual spectrum and infrared spectrum.

Preferably, in step (d) the composite data is displayed to the viewer as one of a 3-dimensional or 2-dimensional video image: (1) on a planar video display, such as a head-mounted display, (2) via projection, or (3) on a collection of planar video displays surrounding the viewer. The composite data could also be displayed on a holographic display.

The depiction in step (d) preferably is an actual image of the object, and contains additional information provided by or derived from the non-imaging surveillance device. Alternatively, the depiction could be a simulated image of the object, or even a combination of actual and simulated images of the object.

In another embodiment, additional steps are performed prior to step (c). Specifically, the presence of the object is detected within the field of view of the imaging surveillance device, and then the coordinate position of the object is determined within the field of view of the imaging surveillance device. The determined coordinate position of the object within the field of view of the imaging surveillance device is then correlated in step (c) with the coordinate position of the object supplied by the non-imaging surveillance device.

The detecting step can be performed by monitoring sequential images captured by the imaging surveillance device to determine a change in position of an object within the field of view of the imaging surveillance device, wherein that change is indicative of the object entering the field of view of the imaging surveillance device.

Alternatively, the detecting step can be performed by comparing archived image data of the field of view of the imaging surveillance device to actual image data of the field of view of the imaging surveillance device to detect when the object enters the field of view of the imaging surveillance device.

Alternatively, the object can be predetermined to be an object of interest, and then the detecting step can be performed by comparing features within the actual image data supplied by the imaging surveillance device to archived features of objects of interest to detect the presence of the object within the field of view of the imaging surveillance device. The feature comparison step may involve one or more methods including object shape analysis, object visual feature relative position or object thermal signature analysis.

The determining step can be performed by comparing the detected position of the object to reference points of known coordinates within the field of view of the imaging surveillance device to determine the coordinate position of the object within the field of view of the imaging surveillance device.

In accordance with another embodiment of the present invention, in step (b) the image data is captured for the object at a plurality of imaging surveillance devices of known location, and then the perspective view of one of the imaging surveillance devices is selected to display that perspective view to the viewer. The image data captured from at least two imaging surveillance devices can also be interleaved to provide a perspective view to the viewer from a position between the two imaging surveillance devices.

In accordance with another embodiment of the present invention, there is provided a system for tracking the position of an object, including (a) means for receiving, at a non-imaging surveillance device of known location, a transmission from the object, (b) means for determining, from the transmission, the coordinate position of the object within a given time period, (c) means for capturing image data for the object at an imaging surveillance device of known location to provide an image of the object within the same given time period, (d) means for correlating the coordinate position with the image to provide composite data about the object within the same given time period, and (e) means for displaying the composite data to a viewer as a visual depiction of the object.

The other alternatives and embodiments discussed above in connection with the method of the present invention apply equally as well to the system of the present invention, and thus will not be repeated.

The method and system described above is particularly suitable for an airport setting, which already has an infrastructure of non-imaging surveillance devices (NSDs) installed for the specific purpose of locating and identifying aircraft and ground vehicles in and around the airport. By employing the method and system of the present invention to supplement that already existing infrastructure, it is possible to remove the requirement that ATC operators have actual line-of-sight contact with the surface environment of the airport. This provides two significant enhancements with respect to traditional ATC infrastructures. First, ATC operators can gain a new visual perspective of the airport without having to relocate or expand the existing ATC tower. Again, since the present invention provides a visual component to the ATC operator through the use of imaging surveillance devices (ISDs), the ATC operator can be positioned at any location, even at a site remote from the airport itself. As a result, the method and system of the present invention overcomes all of the above-discussed problems that will inevitably be encountered by the ATC industry as the amount of air traffic expands in the future.

In addition to overcoming the actual line-of-sight requirement for the ATC operator, the method and system of the present invention actually provides the operator with a more complete visual depiction of the airport activity. For example, since the ISDs will be positioned all around the airport, the ATC operator will be able to have a perspective view of the airport from each individual ISD location. Accordingly, if the ATC operator is viewing a taxiing aircraft from an ISD position that simulates the location of the traditional ATC tower, and that aircraft moves behind a building or some other obstruction, the ATC operator can easily change the view to another ISD location and again reestablish visual contact with the aircraft in question. In the traditional ATC tower setting, the operator would have to simply wait until the aircraft clears the obstruction before reestablishing visual contact with the aircraft.

The use of multiple ISDs also allows different ATC operators to use different ISD perspectives depending upon their respective responsibilities. For example, if an ATC operator is primarily responsible for arrivals and departures, that ATC operator could choose the ISD (or ISDs) positioned near the end of the active runway to provide the most relevant visual data for his/her responsibility. On the other hand, an ATC operator in charge of taxiing aircraft could select the ISD (or ISDs) positioned near the taxiways to facilitate his/her responsibility.

In addition, the ISDs could take the form of imaging devices that are capable of operating in the visual and infrared spectrums, which would provide 24 hour image data, which is not currently available. In the case of infrared ISDs, it is also possible to provide image data in a variety of weather conditions, thus enhancing the ability of ATC operators to maintain safe operations under all conditions.

The method and system of the present invention also facilitates fully utilizing the existing capacity of each airport in the global network of airports by enabling a centralized ATC location to provide appropriately tailored air traffic services to each airport, regardless of size. For example, small airports, which currently lack the traffic levels to justify on-site air traffic services, could receive services from a remotely located ATC facility.

Additionally, the present invention will reduce or eliminate the impact of single airport choke points that cause delays to ripple throughout the entire air traffic network by assisting airports in achieving their Visual Flight Rules capacity under all meteorological conditions including Instrument Meteorological Conditions.

The method and system of the present invention will also provide several cost avoidance and/or cost savings to the air traffic service provider. The present invention will provide the air traffic service provider the ability to centralize technology solutions and IT personnel, thereby reducing the maintenance component of a system's life cycle cost. Maintenance personnel would be assigned where the core components of the system infrastructure reside, enabling a smaller group of highly trained maintenance personnel to maintain the ATC system without compromising safety, in place of a larger number of geographically disperse personnel as may by the case today. Similarly, the present invention would also facilitate dynamic assignment of ATC operators across multiple airports, regions, and even time zones to eliminate personnel utilization fluctuations caused by time of operation and seasonality.

It can be appreciated from the foregoing discussion that the method and system of the present invention provide significant advantages over the current ATC infrastructure, and also allow the existing airports to better manage the expected growth of air traffic in the future. There are additional advantages, however, resulting from being able to remove an existing ATC tower or eliminate the need for an ATC tower in new construction. First, the tower removal will provide existing airport facilities with the ability to increase capacity by expanding the existing airport traffic patterns previously constrained by the physical presence of the ATC tower. Second, the removal of the tower also removes a significant airport growth constraint since current flight operations must be routed around the air traffic control tower to ensure safe flight operations.

These and other advantages of the method and system of the present invention will become more apparent after reviewing the following drawings and detailed description.

DETAILED DESCRIPTION OF THE INVENTION

Figure 1:
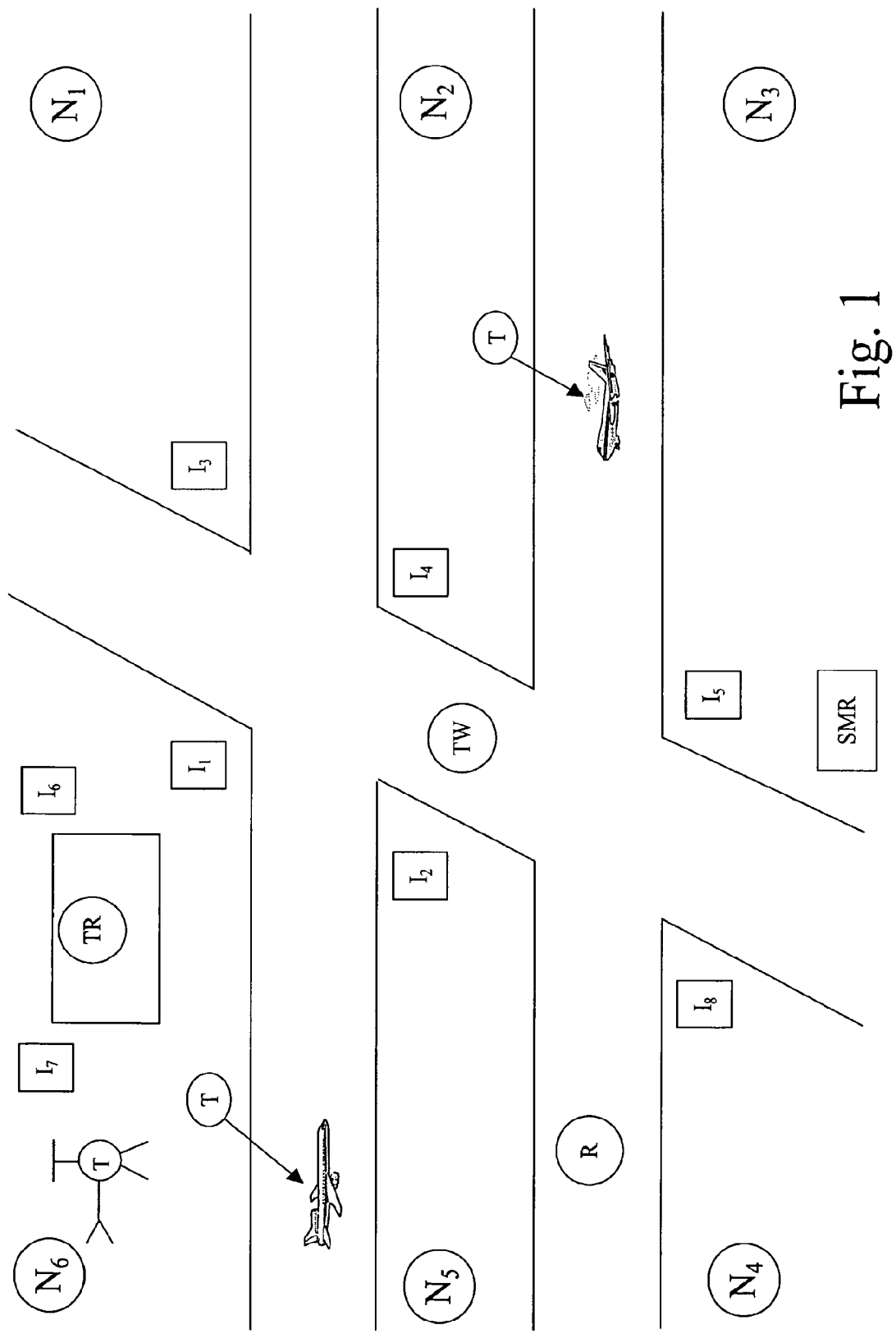
FIG. 1 is a plan view of a hypothetical airport setting.

FIG. 1 is a plan view of a hypothetical airport setting to describe the method and system of the present invention. The airport includes a terminal (TR) located near runways (R) and taxiways (TW) on which aircraft and supporting ground vehicles travel. A plurality ($N_1$-$N_6$) of non-imaging surveillance devices (NSDs) are positioned at known locations around the airport. A plurality ($I_1$-$I_8$) of imaging devices (ISDs) are also positioned at known locations around the airport. FIG. 1 also shows a surface movement radar (SMR) which is used to detect the presence of aircraft and vehicles in and around the airport.

The NSDs used in the present invention can include any type of terrestrial or space-based surveillance device that does not rely upon imaging to detect the presence of a target. The NSDs can be either "cooperative" surveillance devices, in that they rely upon transmissions emitted from a target itself to detect the presence and position of the target, or "non-cooperative" surveillance devices, which do not rely upon any transmissions from the target to detect the presence and position of the target. Examples of non-cooperative NSDs include radar, and examples of cooperative NSDs include ADS-B receivers and MLAT transceivers.

The ISDs in accordance with the present invention can be any type of device that is capable of recording images. These devices by nature are "non-cooperative" surveillance devices, because they do not rely upon any transmissions from a target to detect the presence and position of the target. Examples of suitable ISDs that can be used in the present invention include cameras operating in the visual spectrum and cameras operating in the infrared spectrum.

The types of targets that will operate in and around an airport can include vehicles capable of flight, such as commercial and private aircraft and helicopters, terrestrial vehicles, such as guidance automobiles, fire and fueling trucks, passenger busses and baggage handling vehicles, as well as non-vehicle objects, such as people, runway closure barricades or wildlife. Each of the targets may or may not be equipped with the appropriate equipment to allow it to communicate with cooperative surveillance devices such as those employed in ADS-B and MLAT systems. However, targets that are either without cooperative surveillance equipment or without operating cooperative surveillance equipment do not preclude the tracking of these targets by the method and system of the present invention, due to the overlapping coverage provided by non-cooperative surveillance devices, such as those described earlier herein, and the ISDs. In any event, it is preferred that each target is equipped with a "cooperative" surveillance device.

The cooperative NSDs provide the ATC tower with target positional data received from targets equipped with cooperative surveillance equipment. Generally speaking, a cooperative NSD broadcasts a radio frequency message on a specified frequency or group of frequencies containing target identifying information and may include target-generated information either automatically at a specified periodicity, or in reply to an interrogation by a system not resident on the target. In one embodiment of the present invention, the cooperative surveillance device is an ADS-B system and the positional data is GPS-based data. In another embodiment of the present invention, the cooperative surveillance device is an MLAT system. In yet another embodiment, range of a target is determined by a directional interrogation by one MLAT transceiver, and target azimuth is determined by transmissions received at a plurality of MLAT transceivers.

As is known in the art, in these types of cooperative NSDs, the transmissions are time-stamped upon receipt to allow the transmissions received at multiple like sensors to be clustered to provide a data set about each individual target.

The non-cooperative NSDs (e.g., the SMR) also provide position data for targets in and around the airport. While it is possible that the present invention could make use of non-cooperative surveillance devices alone, it is preferred to use a combination of cooperative and non-cooperative surveillance devices to provide layers of redundancy in the surveillance coverage (as a measure of safety in the event of failure of one or more cooperative or non-cooperative devices). The use of non-cooperative NSDs also is helpful in detecting targets that are not equipped with the necessary equipment to allow those targets to work with cooperative NSDs.

In accordance with the present invention, the traditional NSDs are supplemented by ISDs such as cameras operating in the visual and/or infrared spectrum. The use of ISDs provides image data that can be fused with data from cooperative NSDs (as explained later), and can also be used with data from the non-cooperative NSDs to detect targets that are not equipped to work with cooperative NSDs.

The ISDs provide the visual data of locations/events on the airport's surface and adjacent airspace to enable ATC operators to perform their air traffic control functions without directly visually verifying their understanding of aircraft movements depicted on their displays (i.e., "situational awareness"). More specifically, the ISDs provide operators the ability to detect and track the surface movements of all targets on the ground in and around the airport, as well as airborne aircraft that are proximate to the airport. ISDs are positioned throughout the airport property with overlapping coverage areas to provide the ATC operator with a view of the entire airport property and its surroundings.

In operation, the NSD devices will detect the identity and position of targets (e.g., aircraft and vehicles) in and around the airport, and the data collected from the various NSDs (cooperative and non-cooperative) will be correlated and then fused together and supplied to the ATC operator, typically located in the terminal area. This fused data shows the operator the position of the targets around the airport, thus allowing the operator to manage the movement of the aircraft and ground vehicles in a safe manner.

In accordance with the present invention, the ISDs ($I_1$-$I_8$) provide the visual component to the ATC operator that the operator had traditionally obtained through the windows of the ATC tower. As such, it is no longer necessary for the ATC operator to have visual line-of-sight contact with the surface environment of the airport, nor is it required that the operator even be physically present at the airport being monitored. While FIG. 1 shows seven NSDs ($M_1$-$M_6$ plus SMR) and eight ISDs, it will be understood that the number of NSDs and ISDs will be dictated by the size of the airport under surveillance, with the further understanding that enough ISDs must be deployed to provide the ATC operators with at least adequate imagery to visualize the airport's key areas of interest.

Figure 2:
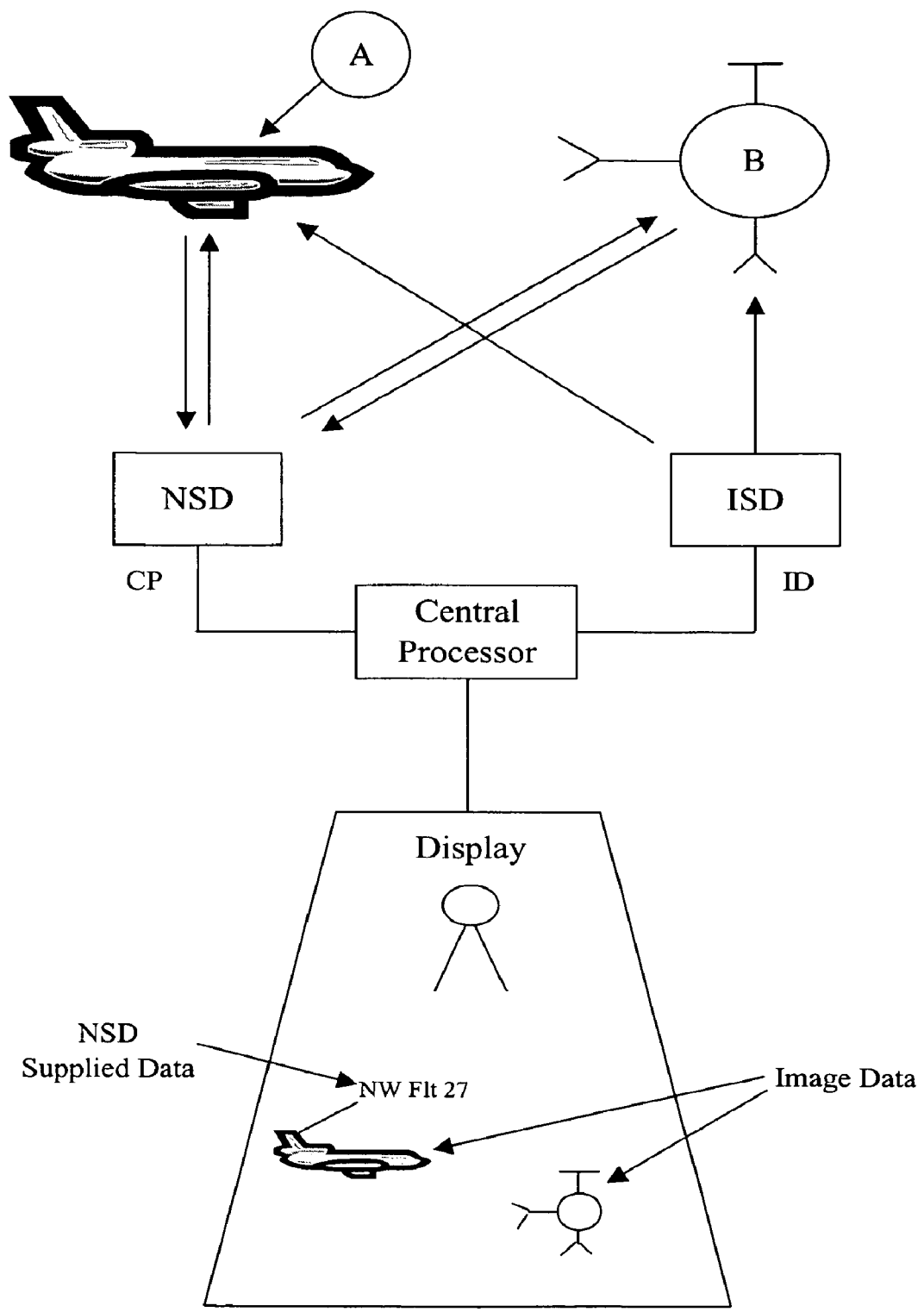
FIG. 2 is a flow diagram showing one embodiment of the method and system of the present invention.

FIG. 2 is a flow diagram showing one embodiment of the method and system of the present invention. For the ease of explanation, FIG. 2 will be described in the context of a single NSD and a single ISD.

The NSD will communicate with targets in and around the airport in a known manner. For example, if the targets are ADS-B-equipped, the NSD would be an ADS-B receiver, which would receive transmissions from the equipped targets, and those transmissions would provide both the identity and the location (via GPS) of each target. The ADS-B receiver would provide, among other things, the coordinate position of each detected ADS-B-equipped target. As explained earlier, the ADS-B transmissions are all time-stamped upon receipt at the ADS-B receiver.

The ISD would capture image data for all targets within its field of view (FOV). Assuming for the sake of this description that targets A and B are both within the FOV of the ISD, the image data captured by the ISD will provide actual footage of both targets in real-time. The image data is also time-stamped upon receipt at the ISD.

The data from the NSD and ISD is routed to the central processor, which, based in part on the time stamps associated with the data, correlates the coordinate positions from the NSD with the image data supplied by the ISD to generate a composite data set that includes real-time imagery of each target combined with some other type of data (e.g., target identity) supplied from the NSD. These composite data sets can then be displayed to the ATC operator as a visual depiction of each target. While the display function of the present invention will be discussed below in more detail, one example is that the ATC operator could be positioned in a room with a large screen video display that gives the operator the perception of actually looking out the window of the ATC tower. On that screen, the operator will see the actual imagery of each target. The additional information provided by the NSD (e.g., target identification, coordinate position) could be overlaid onto each individual target. As is well known in the art, additional data about each target can be provided by or derived from NSDs such as ADS-B receivers, and that data can also be displayed in an overlying fashion on each target. Another option would be to allow the air traffic controller to access that data simply by "clicking on" each target on the video display. In that manner, data such as target flight plan could be easily accessed by the ATC operator.

It will be understood by those skilled in the art that, in any given setting, there will be a plurality of targets in and around the NSD and ISD. If a target that is captured by the ISD is not equipped with any cooperative surveillance equipment and is also not within the line-of-sight of any non-cooperative surveillance devices, the data supplied to the central processor will be only that data provided by the ISD. As such, the central processor will still display the image data to the ATC operator, but that image will not include any overlying data. The ATC operator will then understand that there is no NSD data to corroborate the image provided by the ISD. The reverse is also true, in that the central processor may receive NSD data for a target that is beyond the field of view of the ISD. In that case, one option would be to have the central processor exclude that data altogether, because there is no image data that can be used to supplement the NSD data. Another option would be to create a simulated image of the target for display to the ATC operator. Yet another option would be to supplement the actual image with simulated images to provide a complete image of a target that might otherwise be partially outside the FOV of the ISD.

Figure 3:
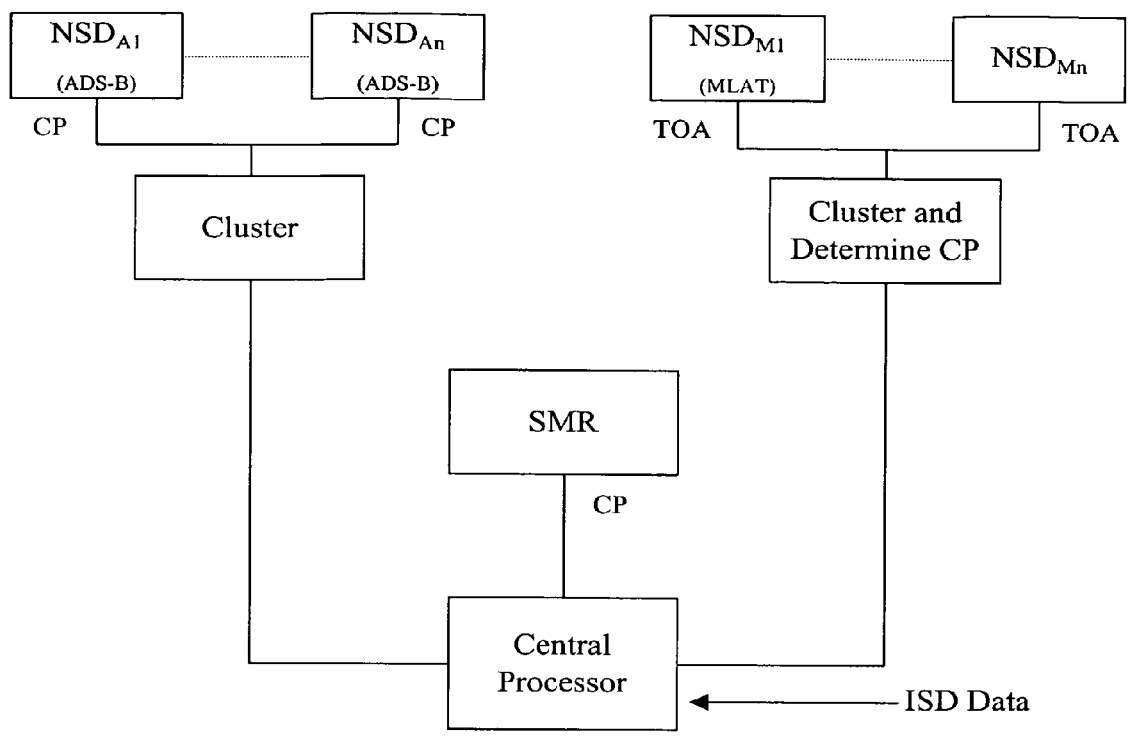
FIG. 3 is a flow diagram showing an alternative branch of the flow diagram from FIG. 2.

As explained above, FIG. 2 demonstrates the basic method and system of the present invention in the context of a single NSD and a single ISD. Another embodiment is shown in FIG. 3, which includes a plurality of NSDs of one type, such as ADS-B receivers ($NSD_{A1}$-$NSD_{An}$) and a plurality of NSDs of another type, such as MLAT transceivers ($NSD_{M1}$-$NSD_{Mn}$) (in both cases n indicates the number of NSDs of each type).

Each ADS-B receiver provides identity and, among other things, coordinate position data for the targets from which it receives transmissions. That coordinate position data is then clustered to avoid false duplication of targets. The output from the MLAT transceivers includes time of arrival (TOA) of transmissions from transponder-equipped targets. The TOA data from the plurality of MLAT transceivers is also clustered and processed by a multilateration algorithm to derive the identity and coordinate position of each target within range of the MLAT transceivers. The output from the SMR also provides the coordinate position of each detected target, but the identity of each target is unknown.

All of this data is sent to the central processor where the data is then fused together in a known manner, such as by using a Multi-Sensor Data Processor (MSDP) system sold by Sensis Corporation. As in the case of FIG. 2, the central processor then correlates this fused data with the received image data for each target to generate a composite data set for each target that is then displayed to the ATC operator as a real-time visual depiction of each target.

Figure 4:
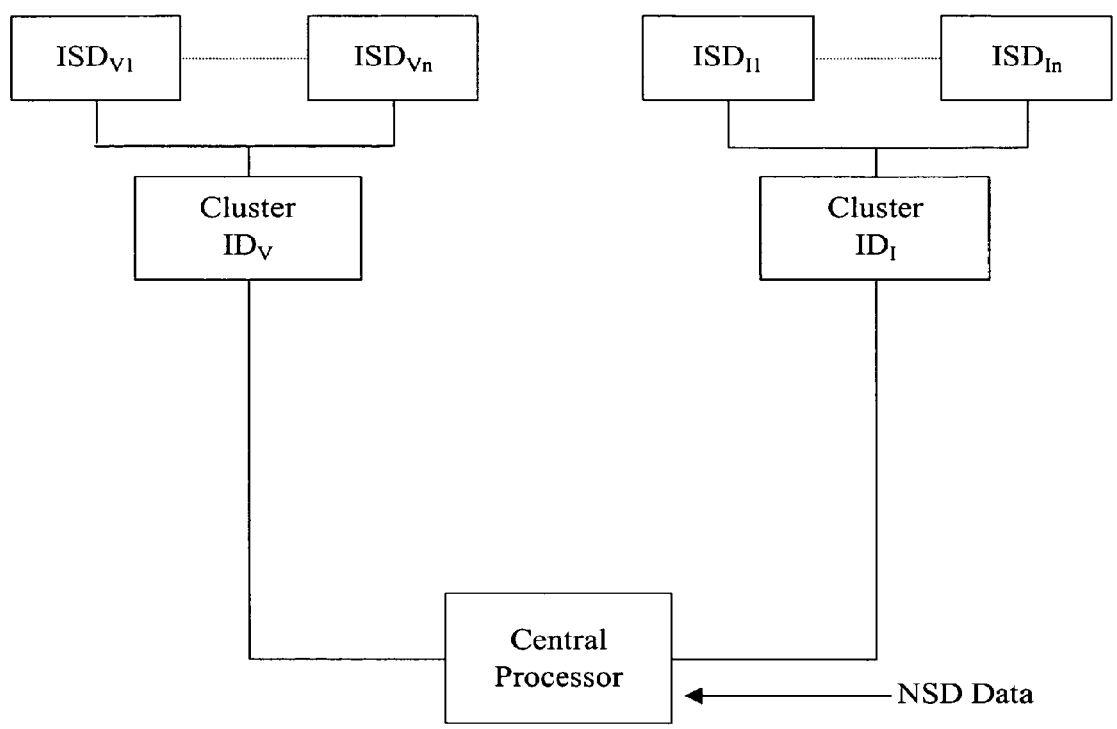
FIG. 4 is a flow diagram showing another alternative branch of the flow diagram from FIG. 2.

FIG. 4 shows that, in addition to using multiple NSDs, the method and system of the present invention can also employ a plurality of ISDs. For example, the present invention can employ a plurality of cameras operating in the visual spectrum ($ISD_{V1}$-$ISD_{Vn}$) and a plurality of cameras operating in the infrared spectrum ($ISD_{I1}$-$ISD_{In}$). The image data provided by the cameras operating in the visual spectrum will be clustered, as will the image data provided by the cameras operating in the infrared spectrum. The clustered data sets will then be correlated, by the central processor, with the data provided by the NSDs to provide composite data for each detected target. Again, the composite data is then displayed to the ATC operator as a real-time visual depiction of each target.

Figure 5:
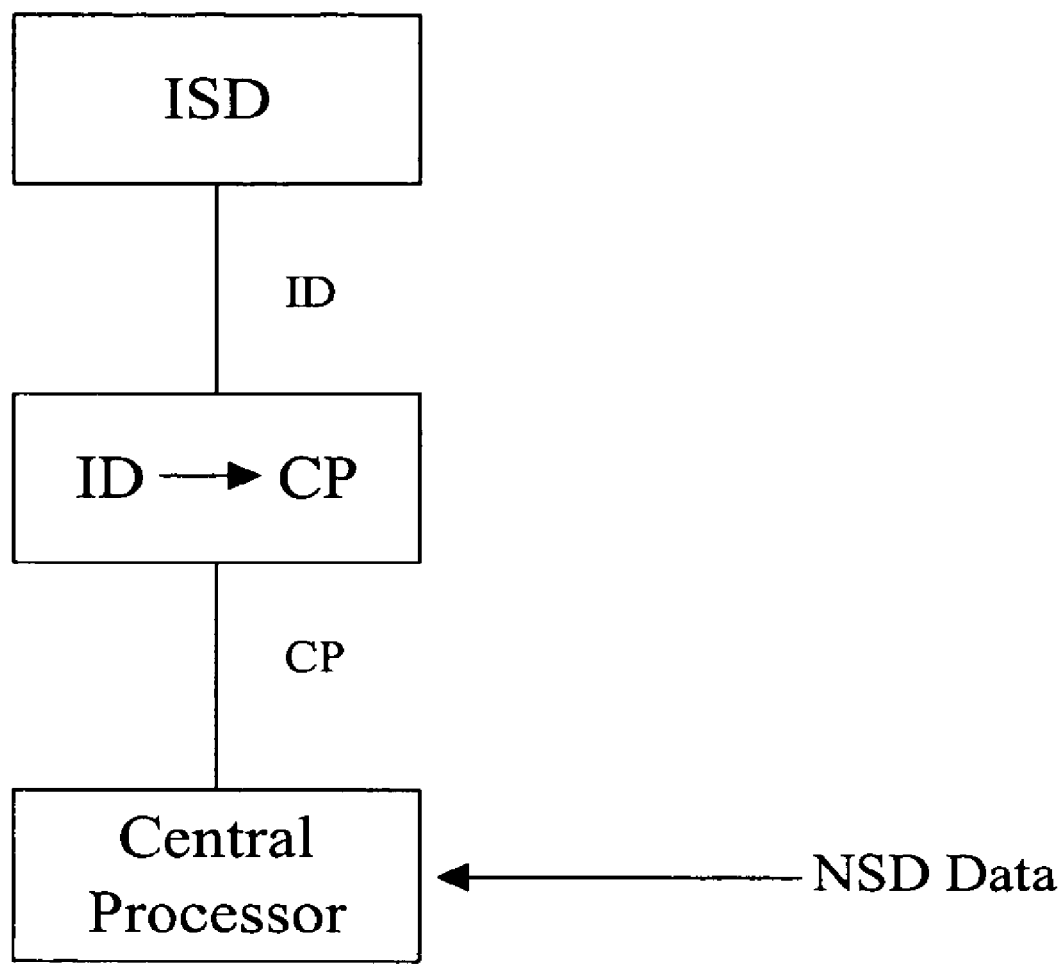
FIG. 5 is a flow diagram for yet another alternative branch of the flow diagram from FIG. 2.

FIG. 5 shows that, prior to being correlated with the data sets from the NSDs, the image data from each ISD can be processed to determine the coordinate position of each target within the FOV of the ISD. In accordance with one embodiment of the present invention, the first step of processing the image data to determine the coordinate position of the target is to detect the presence of the target within the FOV of the ISD. The detection step could be performed by a variety of real-time imaging processing techniques. For example, one detecting method would monitor the images captured by the ISD on a frame-by-frame basis to determine any change in position of an object within the FOV of the ISD. That change would be indicative of an object moving through the FOV of the ISD, and the central processor could interpret the change to be indicative of a target within the FOV of the ISD. Another option would be to create archived image data of the FOV of the ISD, and then the central processor could compare the archived image data with the actual image data to detect any differences. Those differences could be interpreted by the central processor as the presence of a target within the FOV of the ISD.

Yet another detection method could make use of a target database that retains image data about a variety of typical aircraft and ground vehicles. Each frame of video captured by the ISD could be compared against the target database to detect the presence of a target within the FOV of the ISD. This detection method would not only detect the presence of a target, but if the target matches a target in the target database, this detection method would also identify the type of target within the FOV of the ISD. All of this information would be processed by the central processor and included in the composite data that is provided to the ATC operator.

Once a target is detected within the FOV of the ISD, its coordinate position is determined. One way of doing this is to compare the detected position of the target to reference points of known coordinates within the FOV of the ISD. For example, the FOV of the ISD can be calibrated with respect to static structures of known coordinate position (e.g., buildings, runways, etc.) such that, when a target is positioned at a particular location within the FOV of the ISD, the position of the target can be compared to the positions of the reference points to determine the coordinate position of the target itself.

Another method of determining the coordinate position of the target within the FOV of the ISD would be to provide the central processor with a 3-D model of the airport and surrounding terrain. The model could be simulated based on topographical data and the like, or could be actual by including image data from all of the ISDs. The model could be divided into coordinate points of predetermined spacing, and the coordinate points could be arranged in a sphere around a known coordinate point, such as the existing ATC tower or some other location within the terminal. The actual video footage of each target could then be compared to the 3-D model, from which a precise coordinate position for each target could be determined.

Figure 6:
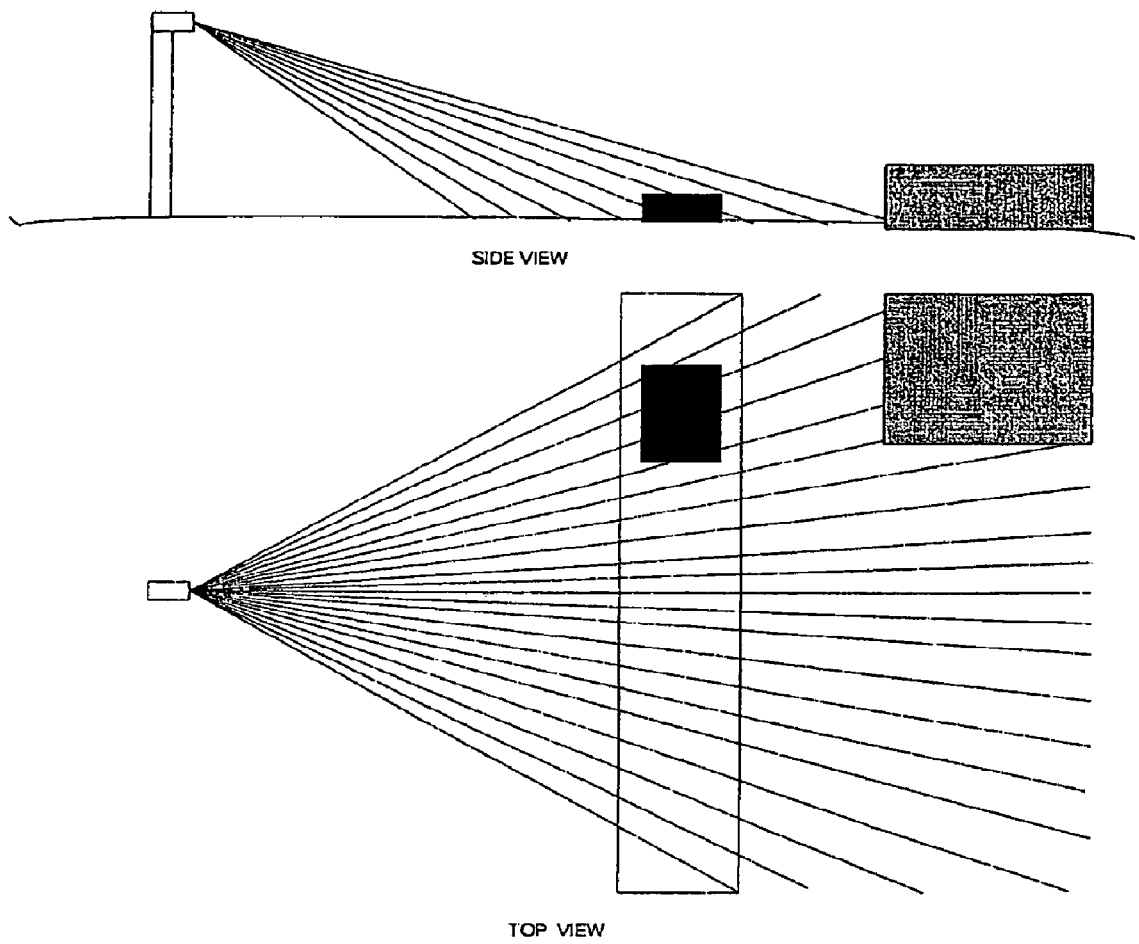
FIG. 6 is a side and top view of the one method by which image data is translated into coordinate position.

As depicted in FIG. 6, another method of determining the coordinate position of the target within the FOV of the ISD would be based on the known azimuth and angle of the optical axis of each ISD. Assuming that the optical axis of an ISD is at a central point in the image frame, and the azimuth and angle of that central point is known, the position (minus range from the ISD) of the target relative to that central point can be easily calculated. This method could be augmented with the known coordinate positions of static structures within the FOV of the ISD to provide a more precise coordinate position for the target in question.

Figure 7:
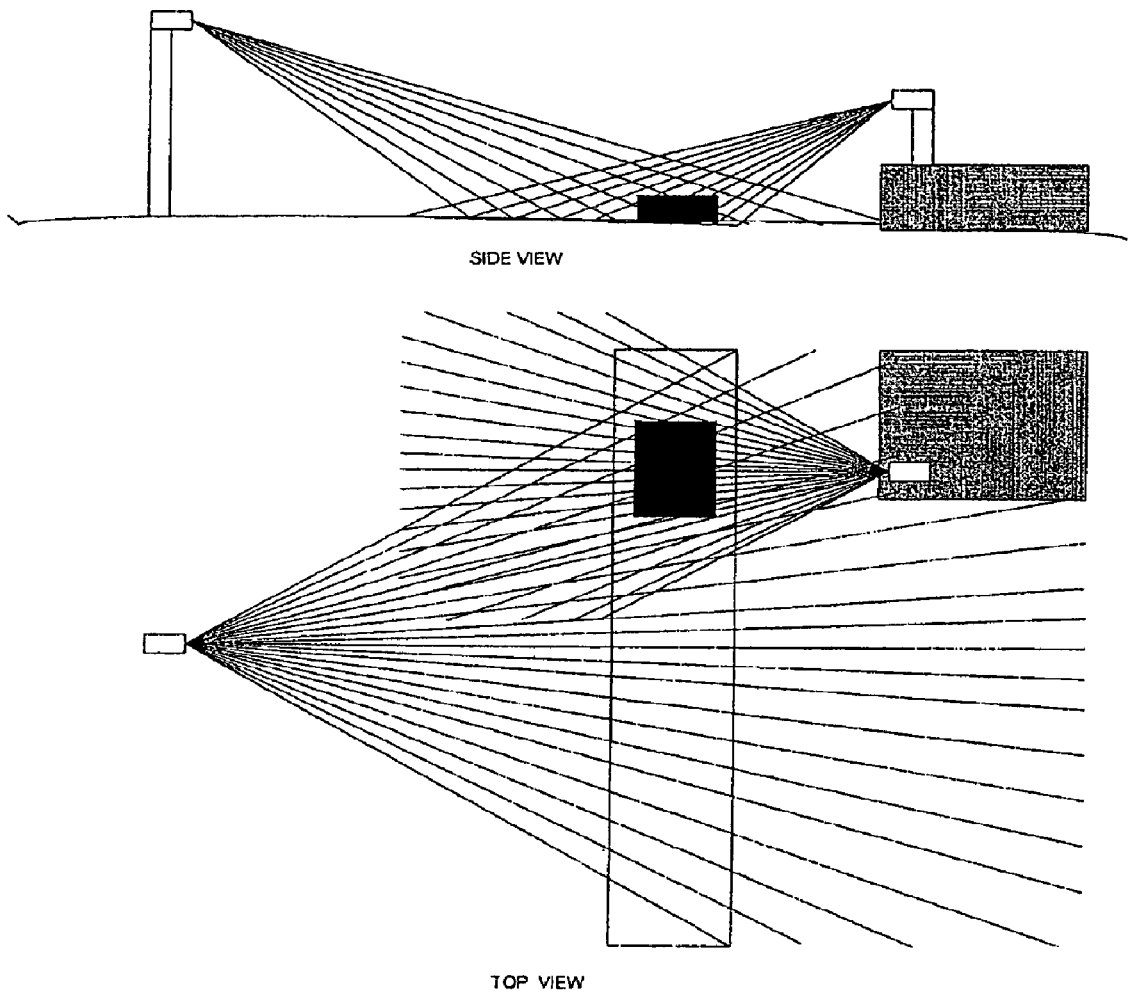
FIG. 7 shows yet another method of determining the coordinate position of the target.

FIG. 7 shows yet another method of determining the coordinate position of the target by comparing overlapping image data received from a variety of ISDs about the same target to resolve the range ambiguity that is inherent in image data. A typical ISD is able to determine elevation and angle well, but range is more difficult to ascertain. The range information can be obtained by comparing the image data from two or more ISDs with overlapping FOV. The more orthogonal the optical axis of the ISDs become, the better the range accuracy of the coordinate position estimate.

Once the coordinate position of each target within the FOV of the ISD is determined, the central processor correlates that coordinate position data with the coordinate position data provided by the NSDs, in the same manner that conventional systems (like a Sensis MSDP) have correlated traditional NSD data. This correlated data is output as the same type of composite data described above (i.e., data that includes the actual video feed of each target now coupled with select data supplied by the NSDs).

In the present embodiment, the image data is correlated with the NSD data by matching coordinate position data from each source (ISD and NSD). The image data could be correlated with the NSD data by other means. For example, the central processor could determine, from the NSD data, that a certain type of aircraft is located within a particular quadrant that is encompassed by the FOV of a particular ISD. If the central processor uses the target database described above to detect the presence of targets within its FOV, the central processor will know what class of aircraft is being captured by the ISD at a given time. The central processor could then conclude that, due to the presence within that particular quadrant of only a single aircraft of the type detected by the NSDs, the ISD data points within the quadrant match.

The method and system of the present invention essentially replace the actual visual perception of an air traffic controller from the perspective of a single ATC tower with an actual image derived from a plurality of ISDs arranged around the airport. The present invention thus allows the air traffic controller to reside at any location, since it is no longer necessary for the air traffic controller to have actual line-of-sight contact with the airport surroundings. This, in turn, negates the need for an ATC tower at the airport, and can even negate the need for the air traffic controller to reside at the airport under surveillance.

Properly sited ISDs will provide complete surveillance coverage of the airport surface, and will allow "3-D tracking" of targets. The ISDs will also provide the ATC operator with the ability to select a three dimensional (3-D) "view" from multiple locations on the airport surface. More specifically, by having a separate ISD at a plurality of locations around the airport, an ATC operator can select the ISD view that best suits that operator's responsibilities. For example, an ATC operator responsible for monitoring aircraft approach and landing at an airport can be provided with a 3-D view from the landing end of the active runway by selecting the ISD (or ISDs) at that location. Similarly, the ATC operator responsible for the airport surface operations can select the "view" from an ideal tower position, not limited by the physical location of the tower. In one embodiment, the ATC operator's selectable locations are limited to locations at which the ISDs are sited. In a preferred embodiment, image data from adjacent ISDs are interleaved so that the ATC operator can select a 3-D view from a perspective between the adjacent ISDs. In fact, the image data from a plurality of ISDs can be merged to create a synthetic 3-D representation of a perspective view from any location on the airport property.

Communications System

Although not depicted in the drawings, the present invention would also include a communication system as one of the cooperative surveillance devices, as the communication system provides the capability to receive verbal position, identity and/or environmental data reports from a target. For example, the present invention could use the existing or future ground-to-aircraft communications system(s) to facilitate voice and/or data communication between the ATC operator and the plurality of targets operating in and around the airport. An airport may use one or more communications systems comprising HF, UHF, VHF, SATCOM, Unicom, Internet Protocol (IP) text messages, voice over IP or other future FAA ground-to-aircraft communication system.

The communication systems interface may be operated by an ATC operator or as an automated interface controlled by the central processor. In the automated communication mode, the ATC operator would have the capability of overriding the automated system and assuming manual control of the communication system.

Visualization Display Systems

The display used in the present invention may be any type of digital image sequence display, including direct view and projection displays. The display may be based on any known electronic display technology, including Organic Light Emitting Diode, Digital Micro-Mirror, Liquid Crystal, Cathode Ray Tube, or Ferro-Electric technology. Preferably, the present invention will employ an immersive display system capable of presenting imagery to either a single operator or a group of operators, such as might be applied in digital cinema or virtual reality systems.

Preferably, the primary display will use a three-dimensional (3-D) display to provide the operator with sufficient depth perception to enhance the operator's situational awareness. The primary 3-D display will display the composite data as a visual image for the view from the selected ISD location to provide the operator with a perspective that enhances the operator's situational awareness. The data displayed on the primary display may be supplemented with additional data displayed using a selectable small window or "data port" and/or additional 2-D displays.

The present invention may use any one or combination of display technologies comprising digital display systems, immersive display systems, virtual reality display systems or holographic display systems, provided the display accommodates visualization of the scene the ATC operator would see looking out the tower window or from another potential location better suited to that operator's area of interest. The display may also be capable of overlaying synthetic representations of the aircraft and/or vehicles on the airport surface in addition to the composite data to enhance the operator's situational awareness under restricted visibility conditions. Some of the technologies applicable to the visualization system are discussed in the following paragraphs.

Holographic Display Systems

One embodiment will use a holographic image to present a 3-D image of the airport environment on the ATC operator's primary display. There are several techniques available for creating a holographic display image. One holographic image display technique, known as active tiling, uses a relatively small electrically addressable spatial light modulator in combination with a relatively large optically addressable spatial light modulator and a large output lens to create and update the holographic image. In the active tiling display technique, the image data is received from the computer as a series of sub-holograms, each consisting of a matrix of light modulation data. When the sub-holograms are tiled together, the matrices provide a complete data array defining a hologram. This technique provides the advantage of faster image update rates because only the data that has changed needs to be updated.

Alternatively, a true-color 3-D laser real-time image recording and projection system using active recording components comprising electronic heterodyne mixers, coherent primary color lasers, electro-optical detectors, electro-acousto-optic modulators; electro-optical spatial light modulators, combined with passive components comprising electronic band-pass filters; optical beam splitters, optical beam expanders, lenses and mirrors. Image projection preferably uses lasers, beam combiners and spatial light modulators.

Immersive Display Systems

An immersive environment is defined as one in which a greater than 25 degree diagonal FOV is provided no more than 10 feet from the viewer. To achieve an immersive environment, the virtual reality or augmented reality display system can utilize a head mounted display (HMD) device that creates the sensation of immersion in a 3-D graphical environment. In addition, specific proximity to a non-head mounted display, such as a monitor at eye level, can create a similar immersive environment. The operator interacts with the immersive environment using a data glove or other standard computer control device.

Virtual Display Systems

An immersive virtual reality environment refers to a computer generated graphical environment wherein the user is "immersed" within the environment so as to provide to the user a sensation of being physically located within the graphical environment, although the participant is only electronically present with other objects within the environment. One type of virtual reality display system, which is widely used in diverse image display environments, uses a stereoscopic display system. This type of stereoscopic 3-D display is generated using a computer-based 3-D modeling system to implement a "virtual" stereoscopic-camera, positioned with respect to a (geometric) model of a 3-D object or scene, both represented within the 3-D modeling system. A computer-based subsystem produces the stereoscopically multiplexed images of the real and/or synthetic 3-D data objects. The display system provides the operator with the capability to view the stereoscopically multiplexed images, which are physically displayed on a display's surface. The greatest advantage of the stereoscopic image display systems is the fact that operators can view objects with depth perception in three-dimensional space.

In one embodiment of the present invention, a helmet mounted display device (HMD) is used as the operator's primary display device. HMD devices are rapidly becoming the standard display device for virtual reality applications. HMD devices generally consist of one or more compact image displaying devices mounted on a helmet type frame that the operator wears on their head. The image displaying devices project images into the viewer's eyes via a series of lenses or mirrors so that the operator perceives the image or images as originating from a source outside of the operator's helmet. In the case of stereoscopic HMD's a separate image is presented to each of the operator's eyes to form a three dimensional (3-D) image.

In one embodiment of the present invention, the primary display will use a stereoscopic system, similar to systems used in virtual reality systems, to provide depth perception to the ATC operator when viewing the three-dimensional environment, which will also display objects, symbols and/or actual video/IR imagery within the field of view (FOV). The HMD provides the operator with a large display projected virtually in front of the operator, thus enabling instantaneous and intuitive visual access to large amounts of visual data.

In another embodiment, the ATC operator's three-dimensional primary display will combine a three-dimensional map with virtual aircraft symbols and associated identifying text that is arranged in spatial relation to that symbol. Each aircraft symbol includes a three-dimensional flight path vector, extending forward from the aircraft symbols position. The size and orientation of the flight path vector is based on the aircraft speed, attitude and orientation, several different informational items are combined in a manner that is concise, yet easy for the operator to read or interpret. The operator, wearing a head-mounted display containing a head-tracker, can open a small window or "data port" at any aircraft's position within the large virtual display by turning the HMD to look at the desired symbol's location and actuating the data port function using either eye movement or an operator input device, such as a virtual reality glove or a computer mouse. The operator can also select an aircraft's symbol by manually operating the input device. Selection of the aircraft's symbol opens a small window displaying all of the known relevant positional data and other navigation data including, airspeed, attitude, altitude, and heading information.

In one embodiment, the video input from the ISDs are operator selectable for display on the operator's 3-D display system. The video input can be displayed either alone or as an underlay correlated and in combination with the 3-D graphics.

Weather Surveillance Device

In addition to fusing the data provided by the NSDs and ISDs as described above, the method and system of the present invention can also integrate weather surveillance data about the weather conditions in and around the airport. Weather surveillance data comprising information such as visibility, wind direction, wind speed, ceiling height, precipitation, icing conditions, wind shear, current barometric altimeter settings and runway braking action data, can be provided as additional visual depictions on the ATC operator's display, or as a selectable link on the display.

One example of a weather surveillance device is the Automated Weather Observing System (AWOS) or Automated Surface Observing System (ASOS). AWOS and ASOS are a suite of sensors that measure, collect and broadcast weather data to pilots, meteorologists and flight dispatchers. The systems are typically located on airports near areas of interest such as the runway. They generate a report each minute with weather data such as: wind speed, direction, and gusts; temperature and dew point; cloud height and coverage; visibility; present weather (rain, drizzle, snow); rain accumulation; thunderstorms and lightning; altimeter; and fog, mist, haze, freezing fog. The information is transmitted to pilots by periodic announcements over the VHF radio. Other users can access the data via land or satellite communication networks.

Operator Input Device

In the present invention, the operator's input device may be any input device including a keypad, keyboard, mouse, slider bar, data glove, joystick or any other device that allows the operator to select among a few discrete options, such as positioning of a data port window or selecting a particular aircraft's symbol.

We claim:

1. A method for tracking the position of an object, comprising the steps of:
   receiving, at a non-imaging surveillance device of known location, a transmission from the object, said transmission being used to determine the coordinate position of the object within a given time period;
   capturing image data for the object at an imaging surveillance device of known location to provide an image of the object within said given time period;
   correlating said coordinate position with said image to provide composite data about the object within said given time period; and
   displaying the composite data to a viewer as a visual depiction of the object.

2. The method of claim 1, wherein said transmission contains position data for the object.

3. The method of claim 1, wherein said transmission is generated in response to a directional interrogation from a single non-imaging surveillance device, and said method further comprises the step of processing said transmission to calculate the range and azimuth of the object relative to said device.

4. The method of claim 1, wherein said transmission is received at a plurality of non-imaging surveillance devices of known location, and said method further comprises the step of processing said transmission to derive position data for the object.

5. The method of claim 4, wherein said processing step uses a multilateration algorithm to derive position data for the object.

6. The method of claim 4, wherein said transmission is generated in response to an interrogation from a non-imaging surveillance device, and said method further comprises the step of processing said transmission to determine range from the interrogating device and azimuth from the plurality of devices using the difference in time of arrival of the transmission at each said device.

7. The method of claim 1, wherein said method further comprises the step of generating position data for the object within said given time period using a non-interrogating, non-imaging surveillance device, and said correlating step comprises correlating said coordinate position with said generated position data.

8. The method of claim 7, wherein said non-interrogating, non-imaging surveillance device includes primary radar.

9. The method of claim 1, wherein said imaging surveillance device includes a camera operating in at least one of the visual spectrum and infrared spectrum.

10. The method of claim 1, wherein the composite data is displayed to the viewer as one of a 3-dimensional or 2-dimensional video image on a planar video display.

11. The method of claim 10, wherein said planar video display is a head-mounted display.

12. The method of claim 1, wherein the composite data is displayed via projection or a collection of planar video displays surrounding the viewer.

13. The method of claim 1, wherein the composite data is displayed on a holographic display.

14. The method of claim 1, wherein said visual depiction is an actual image of the object, and contains additional information provided by or derived from said non-imaging surveillance device.

15. The method of claim 1, wherein said visual depiction is a simulated image of the object, and contains additional information provided by or derived from said non-imaging surveillance device.

16. The method of claim 1, wherein said visual depiction is a combination of actual and simulated images of the object, and contains additional information provided by or derived from said non-imaging surveillance device.

17. The method of claim 1, further comprising the steps of:
   detecting the presence of the object within the field of view of said imaging surveillance device;

determining the coordinate position of the object within the field of view of said imaging surveillance device; and correlating the determined coordinate position of the object within the field of view of the imaging surveillance device with the coordinate position of the object supplied by said non-imaging surveillance device.

18. The method of claim 17, wherein said detecting step comprises monitoring sequential images captured by said imaging surveillance device to determine a change in position of an object within the field of view of said imaging surveillance device, said change being indicative of the object entering the field of view of said imaging surveillance device.

19. The method of claim 17, wherein said detecting step comprises comparing archived image data of the field of view of said imaging surveillance device to actual image data of the field of view of said imaging surveillance device to detect when the object enters the field of view of said imaging surveillance device.

20. The method of claim 17, wherein the object is predetermined to be an object of interest, and said detecting step comprises comparing features within the actual image data supplied by said imaging surveillance device to archived features of objects of interest to detect the presence of the object within the field of view of said imaging surveillance device.

21. The method of claim 17, wherein said determining step comprises comparing the detected position of the object to reference points of known coordinates within the field of view of said imaging surveillance device to determine the coordinate position of the object within the field of view of said imaging surveillance device.

22. The method of claim 1, wherein the object comprises at least one of an aircraft and ground vehicle in and around an airport.

23. The method of claim 1, wherein image data is captured for the object at a plurality of imaging surveillance devices of known location, and said method further comprises the step of selecting the perspective view of one of said imaging surveillance devices to display that perspective view to the viewer.

24. The method of claim 23, wherein the image data from at least two of said imaging surveillance devices is interleaved to provide a perspective view to the viewer from a position between said at least two imaging surveillance devices.

25. A system for tracking the position of an object, comprising:
  means for receiving, at a non-imaging surveillance device of known location, a transmission from the object;
  means for determining, based on said received transmission, the coordinate position of the object within a given time period;
  means for capturing image data for the object at an imaging surveillance device of known location to provide an image of the object within said given time period;
  means for correlating said coordinate position with said image to provide composite data about the object within said given time period; and
  means for displaying the composite data to a viewer as a visual depiction of the object.

26. The system of claim 25, wherein said transmission contains position data for the object.

27. The system of claim 25, wherein said transmission is generated in response to a directional interrogation from a single non-imaging surveillance device, and said system further comprises means for processing said transmission to calculate the range and azimuth of the object relative to said device.

28. The system of claim 25, wherein said transmission is received at a plurality of non-imaging surveillance devices of known location, and said system further comprises means for processing said transmission to derive position data for the object.

29. The system of claim 28, wherein said means for processing said transmission includes a multilateration algorithm to derive position data for the object.

30. The system of claim 28, wherein said transmission is generated in response to an interrogation from a non-imaging surveillance device, and said system further comprises means for processing said transmission to determine range from the interrogating device and azimuth from the plurality of devices using the difference in time of arrival of the transmission at each said device.

31. The system of claim 25, wherein said system further comprises means for generating position data for the object within said given time period using a non-interrogating, non-imaging surveillance device, and said means for correlating correlates said coordinate position with said generated position data.

32. The system of claim 31, wherein said non-interrogating, non-imaging surveillance device includes primary radar.

33. The system of claim 25, wherein said imaging surveillance device includes a camera operating in at least one of the visual spectrum and infrared spectrum.

34. The system of claim 25, wherein the composite data is displayed to the viewer as one of a 3-dimensional or 2-dimensional video image, and said means for displaying comprises a planar video display.

35. The system of claim 34, wherein said planar video display is a head-mounted display.

36. The system of claim 25, wherein said means for displaying comprises a projection system or a collection of planar video displays surrounding the viewer.

37. The system of claim 25, wherein said means for displaying comprises a holographic display.

38. The system of claim 25, wherein said visual depiction is an actual image of the object, and contains additional information provided by or derived from said non-imaging surveillance device.

39. The system of claim 25, wherein said visual depiction is a simulated image of the object, and contains additional information provided by or derived from said non-imaging surveillance device.

40. The system of claim 25, wherein said visual depiction is a combination of actual and simulated images of the object, and contains additional information provided by or derived from said non-imaging surveillance device.

41. The system of claim 25, further comprising:
  means for detecting the presence of the object within the field of view of said imaging surveillance device;
  means for determining the coordinate position of the object within the field of view of said imaging surveillance device; and
  means for correlating the determined coordinate position of the object within the field of view of the imaging surveillance device with the coordinate position of the object supplied by said non-imaging surveillance device.

42. The system of claim 41, wherein said means for detecting comprises means for monitoring sequential images captured by said imaging surveillance device to determine a change in position of an object within the field of view of said imaging surveillance device, said change being indicative of the object entering the field of view of said imaging surveillance device.

43. The system of claim 41, wherein said means for detecting comprises means for comparing archived image data of the field of view of said imaging surveillance device to actual image data of the field of view of said imaging surveillance device to detect when the object enters the field of view of said imaging surveillance device.

44. The system of claim 41, wherein the object is predetermined to be an object of interest, and said means for detecting comprises means for comparing features within the actual image data supplied by said imaging surveillance device to archived features of objects of interest to detect the presence of the object within the field of view of said imaging surveillance device.

45. The system of claim 41, wherein said means for determining comprises means for comparing the detected position of the object to reference points of known coordinates within the field of view of said imaging surveillance device to determine the coordinate position of the object within the field of view of said imaging surveillance device.

46. The system of claim 25, wherein the object comprises at least one of an aircraft and ground vehicle in and around an airport.

47. The system of claim 25, wherein image data is captured for the object at a plurality of imaging surveillance devices of known location, and said system further comprises means for selecting the perspective view of one of said imaging surveillance devices to display that perspective view to the viewer.

48. The system of claim 47, wherein the image data from at least two of said imaging surveillance devices is interleaved to provide a perspective view to the viewer from a position between said at least two imaging surveillance devices.

49. A method for tracking the position of an object, comprising the steps of:
receiving, at a plurality of non-imaging surveillance devices of known location, a transmission from the object, said transmission being used to determine the coordinate position of the object within a given time period;
correlating the transmission received at each of said non-imaging surveillance devices with the transmission received at each of the other of said non-imaging surveillance devices within said given time period;
capturing image data for the object at a plurality of imaging surveillance devices of known location to provide images of the object within said given time period;
correlating the image received at each of said imaging surveillance devices with the image received at each of the other of said imaging surveillance devices within said given time period;
correlating said coordinate position with said images to provide composite data about the object within said given time period; and
displaying the composite data to a viewer as a visual depiction of the object.

50. A system for tracking the position of an object, comprising:
means for receiving, at a plurality of non-imaging surveillance devices of known location, a transmission from the object;
means for correlating the transmission received at each of said non-imaging surveillance devices with the transmission received at each of the other of said non-imaging surveillance devices within a given time period;
means for determining, based on the correlated transmissions, the coordinate position of the object within said given time period;
means for capturing image data for the object at a plurality of imaging surveillance devices of known location to provide images of the object within said given time period;
means for correlating the image received at each of said imaging surveillance devices with the image received at each of the other of said imaging surveillance devices within said given time period;
means for correlating said coordinate position with said images to provide composite data about the object within said given time period; and
means for displaying the composite data to a viewer as a visual depiction of the object.

* * * * *